XR 3,751,670

United States Patent [19] [11] 3,751,670

Grodner et al. [45] Aug. 7, 1973

[54] SUBSCRIPTION COMMUNICATION SYSTEM

[75] Inventors: Seymour L. Grodner, Hartsdale, N.Y.; Marvin I. Radlauer, Matawan, N.J.

[73] Assignee: Telebeam Corporation, New York, N.Y.

[22] Filed: May 11, 1971

[21] Appl. No.: 142,331

[52] U.S. Cl. ...... 250/199, 178/DIG. 9, 178/DIG. 13, 325/31, 325/308

[51] Int. Cl. ........ H04b

[58] Field of Search ........ 178/DIG. 9, DIG. 13; 250/199; 325/3, 5, 51, 53, 54, 31, 308

[56] References Cited

UNITED STATES PATENTS

| | | | |
|---|---|---|---|
| 3,278,677 | 10/1966 | Fannoy | 178/DIG. 13 |
| 3,288,922 | 11/1966 | Walker | 325/31 X |
| 3,492,484 | 1/1970 | Iti | 250/199 |
| 3,617,750 | 11/1970 | Walker | 250/199 |

*Primary Examiner*—Benedict V. Safourek
*Attorney*—Myron Cohen, Maurice B. Stiefel and Irving Newman

[57] ABSTRACT

A subscription communication system is described wherein each one of many subscribers has his own individual optical communications service link from a common distribution station. As a result, there is positive control over the communications service provided to each subscriber, and information as to the subscriber's economic accountability for such service is generated right at the distribution station. A service request communications link is also provided from each subscriber station to the distribution station, preferably in the form of an optical signal, and the economic accountability of the subscriber is dependent upon receipt of the request signal. The service and request signals are affected equally by adverse weather conditions, so that the subscriber is not billed for service under weather conditions which are below the threshold of system availability.

9 Claims, 8 Drawing Figures

*INVENTORS*
SEYMOUR L. GRODNER
MARVIN I. RADLAUER
BY Louis Altman
Att'y

INVENTOR.

BY

INVENTOR.

BY

INVENTOR.

BY

PATENTED AUG 7 1973 3,751,670

SHEET 5 OF 5

INVENTOR.

BY

SUBSCRIPTION COMMUNICATION SYSTEM

FIELD OF THE INVENTION

This invention concerns subscription television and other communications distribution systems which operate on a user payment basis, and which employ optical signals.

BACKGROUND OF THE INVENTION

The use of optical signal links to convey various kinds of signals, such as audio, video, digital or analog, is well recognized in the technical literature at the present time, and is beginning to be used in a variety of practical communications systems. See for example, the article by Leon M. Magill entitled "Optical Link Firms See Wide Horizons," appearing in the Dec. 21st, 1970 issue of "Electronics," a magazine published by McGraw-Hill, Inc. of New York, New York, and the article entitled "Gallium Arsenide Diode Sends Television By Infrared Beam," appearing in the October 5, 1962 issue of the same magazine. Optical communications links have not yet, however, been used in paid entertainment or other subscription communications systems.

U.S. Pat. No. 1,984,673 of A.B. Du Mont does suggest the use of an optical signal for broadcasting television programming, but the Du Mont system contemplates radiation of the signal in all directions for unrestricted reception without payment. Presumably, therefore, the Du Mont system envisions conventional broadcasting with economic reliance upon commercial advertising. Apart from special cases such as non-profit educational broadcasting, a system which depends economically upon payments from subscribers must have a very selective, narrow beam signal, and either the signal or its usefulness to the subscriber must be under positive control of the broadcaster so that he can shut off service for non-payment.

Selective transmission is achieved in present-day subscription communication systems by the use of either dedicated or multiplexed hard-wire facilities. Specifically, most subscription systems either install their own coaxial cables or time-share the facilities of the local telephone utility. Such hard-wire channels permit a signal to be directed specifically to those individuals who are subscribers, and prevent interception of the signal by those who are not subscribers; but they are expensive. Long distance phone lines are costly, and lengthy messages are expensive to send over telephone lines even when the transmission distances are short. Furthermore, in order to make sure that the telephone utility is always available on demand, it may be necessary to lease and dedicate a certain portion of the telephone facilities to the particular subscription service, which is costly. Voice grade telephone lines are unsuitable for broadband information channels such as television, which require coaxial cables. Such cables involve large initial construction costs and considerable subsequent maintainence. Moreover, both the installation and maintainance phases of operation can cause considerable disruption in a densely populated urban area, which is economically the most favorable environment for TV and other subscription services.

None of the present day subscription communication transmission facilities provides a good solution to the problem of how the subscriber requests service, or the problem of how the broadcaster is to know that service is being received and should be charged to the subscriber. The first problem has several aspects. The subscriber needs to be able to tell the broadcaster when he would like service to begin, when he would like it to end, and in certain systems he needs to specify one of several alternative channels. Technology is not available at the present time to provide bi-directional repeaters in the coaxial cables now used for subscription TV distribution. Therefore the feedback from subscriber to broadcaster in present systems must be done over the telephone system or dedicated wires installed by the broadcaster. The dedicated wire approach is expensive, and the telephone approach also has certain problems. For one thing, the telephone utility is not always instantaneously available to the subscriber, unless he goes to the expense of leasing a line. In addition, in a system providing phone service to a large number of subscribers concurrently, it is necessary to have a large number of incoming telephone lines controlled by sophisticated multiplexing equipment, usually computer operated.

An additional difficulty with present day subscription systems is that the distribution network does not really lend itself to easy handling of the economic accountability problem. Consider a conventional coaxial cable subscription TV system, in which each subscriber derives his signal from an individual pick-off line tapped into a common feeder shared with the other subscribers in the same building or the same neighborhood. In that kind of distribution network, the signal must be present on all the individual subscriber lines if it is to be available to any one of the subscribers on the common feeder. Then various complicated techniques must be resorted to for scrambling the signal or otherwise making it unusable to the particular subscriber unless he commits himself to pay the purchase price for a given amount of programming. Upon receipt of a message from the subscriber that he agrees to be billed for a certain unit of programming, the broadcaster's equipment must take some affirmative action, effective at the subscriber's home, to unscramble the signal.

Note that the transmission channel over which the subscriber requests service is usually not the same channel over which the service itself is provided. Also the transmission channel over which the broadcaster unscrambles the signal is not the same channel as the one over which the signal itself is provided, otherwise the signal would be unscrambled and available to all subscribers equally, including those who had not agreed to pay for the particular unit of programming in question. Therefore, it is possible for these diverse communication channels to have differential effectiveness. A subscriber may deliver the message that he agrees to be billed for a particular TV program, but the channel over which the TV service is transmitted may fail. This leaves the subscriber in the uncomfortable position of being charged for service he did not actually receive.

THE INVENTION

The present invention avoids these problems by the use of individual direct optical signal links from a distribution station to each subscriber station. As used herein, the term "optical" is used in a way which comprehends the visible, ultra-violet and infrared portions of the electromagnetic frequency spectrum; i.e. that frequency band which is focusable by refractive lenses. Practical signal sources, such as lasers and light-emitting semiconductor diodes, are presently available in this frequency range, and so are suitable heterodyning or photon-counting signal detection techniques. See, for example, the article entitled "Optical Transmission Utilizing Injection Light Sources" by Karl L. Konnerth and Bankim R. Shah, appearing in the September 1970 issue of Spectrum Magazine, published by the Institute of Electrical and Electronics Engineers, which goes into considerable detail concerning the design of a point-to-point optical communications system which achieved 98% system availability in operation under the weather conditions prevailing in Montreal, Canada. This level of system availability is high enough to be considered practical for television and other subscription systems.

Visible light, ultra-violet and infra-red radiation can be focused by conventional refractive lenses to form highly directional beams, and aim them quite selectively at a particular target. Hence light beams are ideal for use as signal carriers in an urban environment, where they can be aimed acurately from a distribution station near the top of one building to the window of a subscriber's apartment in another building. In addition, optical signals are difficult for outsiders to locate, and, if they are high above street level, difficult to intercept. This gives a high degree of system security, and makes it difficult to derive free communication services from the signal. Moreover, if anyone did successfully intercept an optical signal, it would result in the reduction or complete disappearance of the signal at the intended receiving station, which would alert the authorized recipient. An additional feature of an optical subscription system which makes theft difficult, is the fact that it lends itself to lower duty cycle operation; i.e. the signal beamed at a particular subscriber's station is turned on only when that subscriber wants service. It is not on all the time, nor is it on whenever any one of several subscribers on a common feeder requires service. Thus, for a given subscriber communication link, the availabilty of an interceptable signal is lower.

The fact that each subscriber can be provided with his own individual optical signal beam, independently of all other subscribers, permits the distribution network system of this invention to be organized along advantageous lines. The present system, in which independent communications links for each subscriber "branch" out from the distribution station, may be referred to for present purposes as a "ramified" network. This is contrasted with prior art systems in which a plurality of subscribers share a common feeder line, and in order to make the signal available at any one subscriber station, it must be made available at all subscriber stations on the common feeder. A ramified network permits service to any one subscriber station to be turned on or off independently of all the other subscriber stations served by the same distribution station, which simplifies the problem of economic accountability. When a subscriber requests service, his optical signal is turned on; at other times it is simply turned off. Therefore the subscription broadcaster knows, from evidence available at his own distribution station, when a particular subscriber's signal is available or unavailable, and can charge the subscriber's account accordingly. There is no need for scrambling or other techniques for rendering a signal usable at certain times and not usable at other times.

This has certain advantages for the subscriber also. In a scrambling system, the broadcaster may truly be said to sell not the programming itself, but the key to deciphering the programming. Thus, if decoding information is given to the subscriber for a particular block of program time, the broadcaster assumes it must have been used by the subscriber, and charges him accordingly. If the subscriber does not watch the entire program, he pays for more service than he actually used. In a ramified system, on the other hand, the charge can be more nearly proportional to actual usage. Since the broadcaster knows when he is transmitting and when he is not transmitting to a particular subscriber, he can charge accordingly. The use of optical communications links in a subscription communications system also solves many of the prior art problems concerning the subscriber's request for service. In a preferred embodiment of this invention there is, in addition to the optical service link going from the distribution station to each subscriber station, an optical request link from each subscriber station to the distribution station, using as a transmission medium the same air path as the service signal. Over this "feedback" link the subscriber can tell the distribution station when he wants his subscription service turned on or off, and also indicate his choice of channel.

The link from the subscriber station to the distribution station can also be used for continuously or intermittently monitoring the subscriber's utilization of the requested signal. For example, the service signal may be cut off any time the request signal terminates. This permits the subscriber to change his mind after utilizing a portion of a program unit, and turn it off without being economically accountable for the balance. Instead of selling signal decoding information, this system actually sells the programming service.

DETAILED DESCRIPTION OF THE PREFERRED EMBODIMENTS

Figure 1:
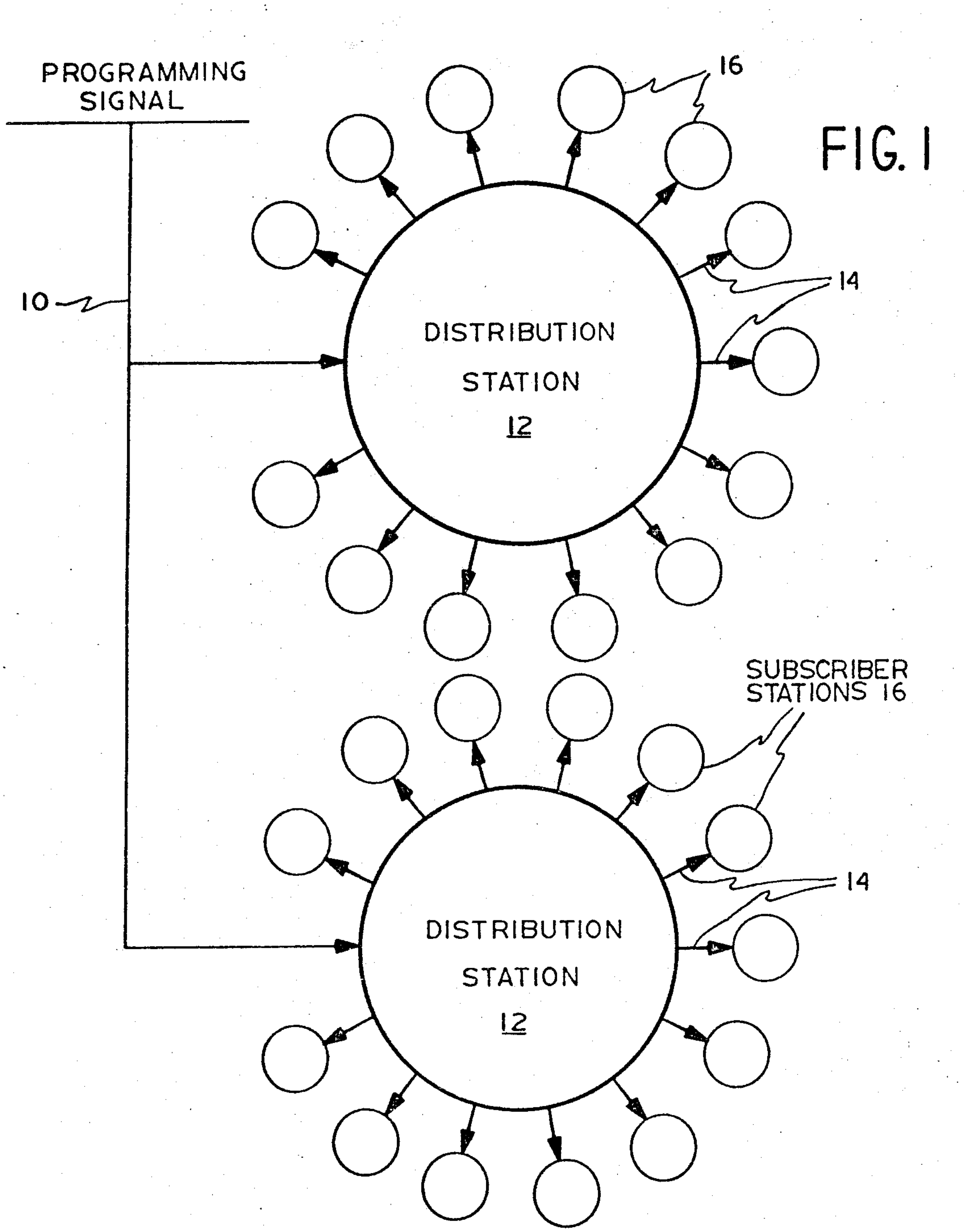
FIG. 1 is a diagram of a "ramified" distribution network in accordance with this invention.

FIG. 1 shows the general topology of what has been termed a "ramified" distribution network for a subscription communications system. A signal carrying the desired programming, represented by arrows 10, goes to each one of a plurality of distribution stations 12. The distribution of signal 10 to the stations may or may not be organized in a ramified network; in the specific illustration of FIG. 1, it is not. But the distribution of programming service signals from each distribution station 12 is organized along ramified lines. Specifically, each of a plurality of individual programming signals 14 radiates outwardly from its respective distribution station 12, and goes only to one of several subscriber stations 16. Since none of the subscriber stations 16 shares its signal link 14 with any other station, the service to each station can be turned on and off entirely independently of the service to other stations. This greatly simplifies the control, signal selectively and economic accountability aspects of a subscription communications system.

In a preferred embodiment of the invention adapted for subscription television broadcasting, the signal source is an automated video tape library 20 comprising video tape playback equipment controllable in conventional fashion to play particular video tape reels upon receipt of appropriate signals. In short, library 20 is a video "jukebox" making TV programming available on demand. A plurality of individual channel outputs 22.1 through 22.4 emanate from the tape library 20 to provide a choice of programs. Each of these outputs constitutes a different program channel, and represents a different baseband frequency.

Each channel output is up-converted by a frequency converter, such as circuit 24, from baseband to the video frequency band by modulating a video subcarrier frequency provided by a subcarrier oscillator, e.g. circuit 26. Similar processing of the other frequency channel outputs 22 is also carried on. Then the video-modulated subcarrier for channels 22.1 and 22.2 are mixed in a circuit 28, the output of that circuit is mixed with the video-modulate subcarrier of channel 22.3 in another circuit 30, and that output in turn is mixed with the video-modulated subcarrier for channel 22.4 in still another circuit 32. Finally, the output of circuit 32, carrying all the video channels, goes to a primary video signal source 34 for transmission.

In a practical embodiment of the present subscription TV system, it is contemplated that, for example, twenty video channels would be carried in a band ranging from 8 to 128 MHz, a total bandwidth of 120 MHz encompassing 20 video channels each having a bandwidth of 6 MHz.

Figure 2A:
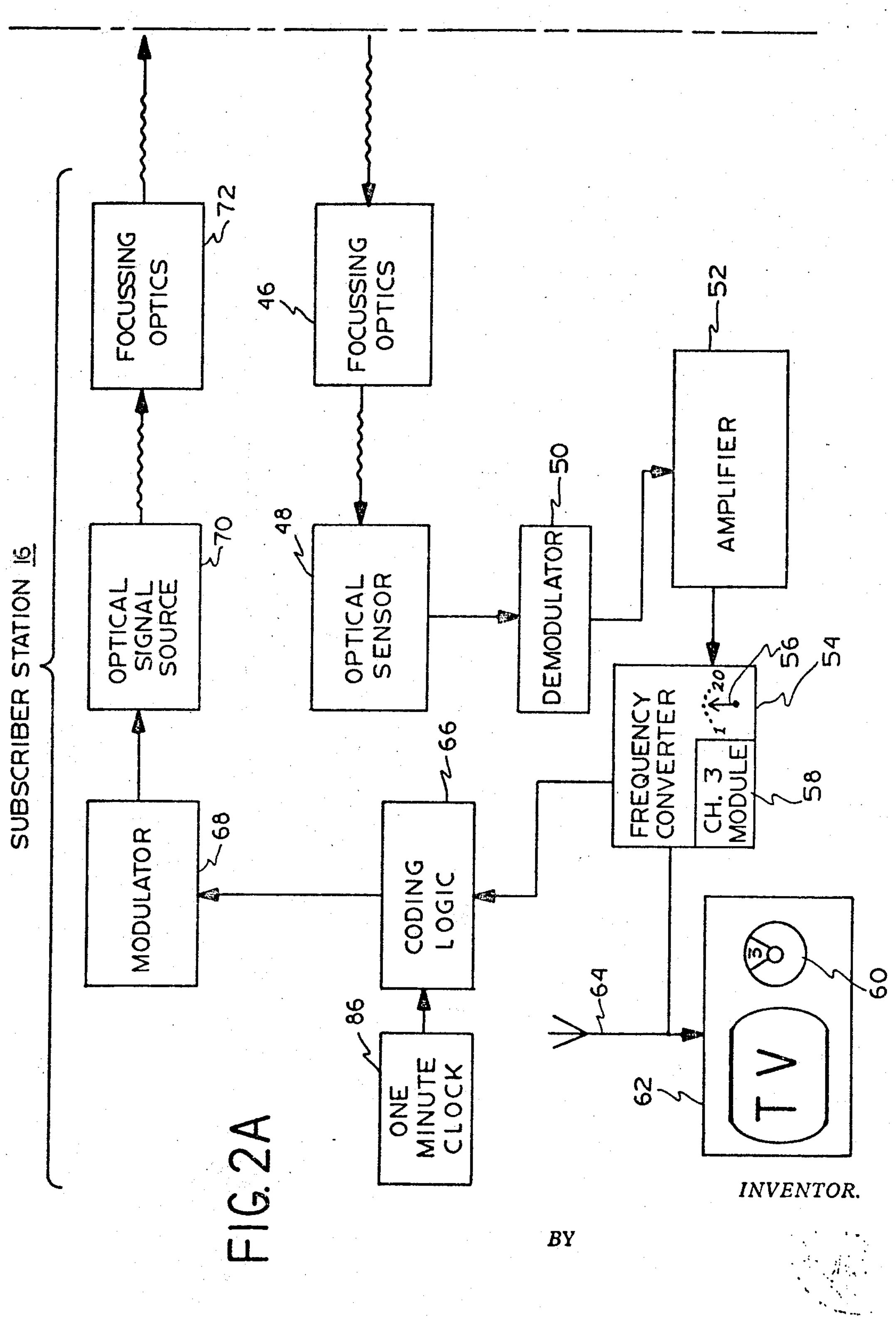
FIG. 2A–2D are block diagrams of a subscription communications system in accordance with the invention.
Figure 2B:
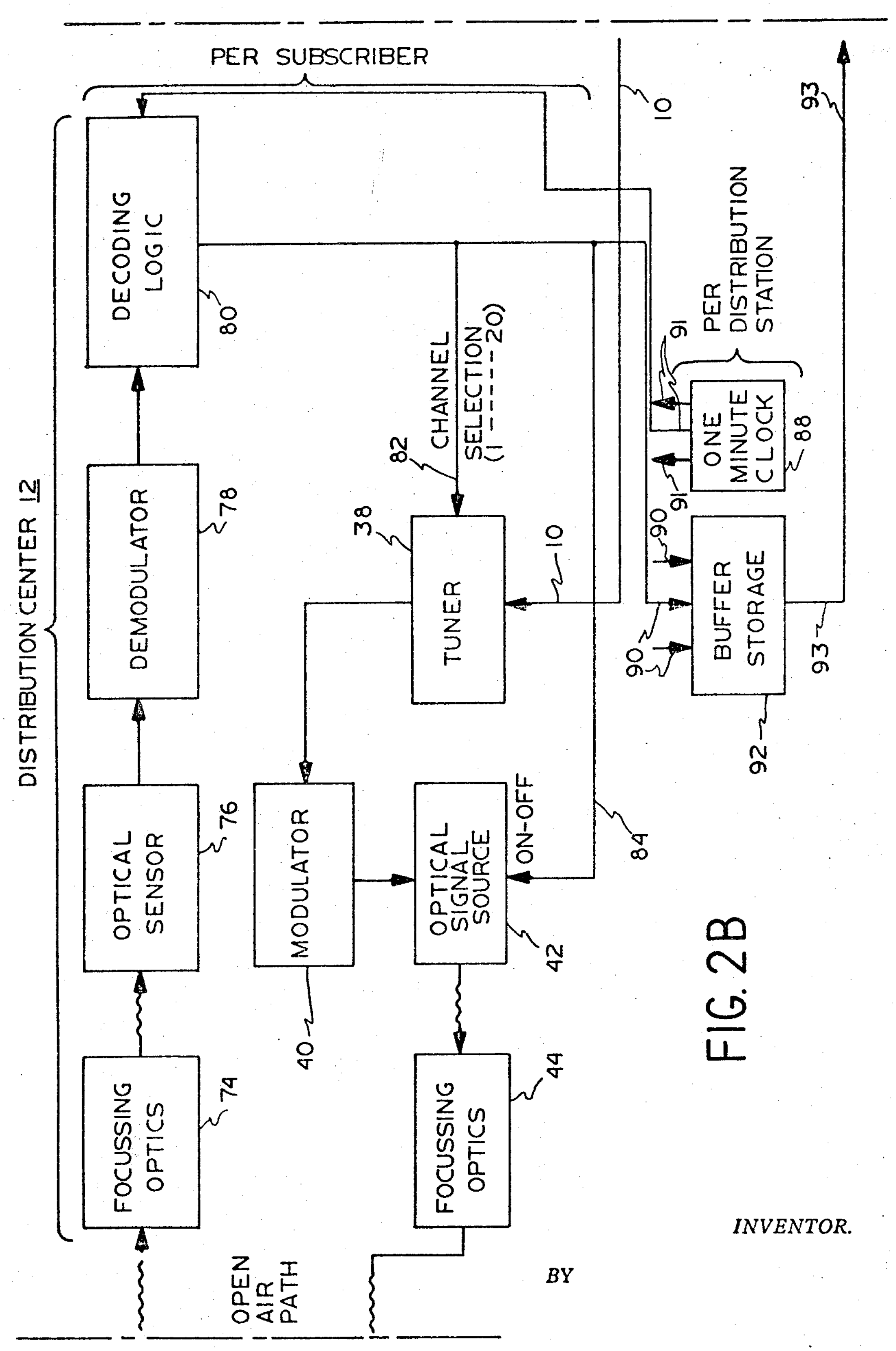
Figures 2C, 2D:
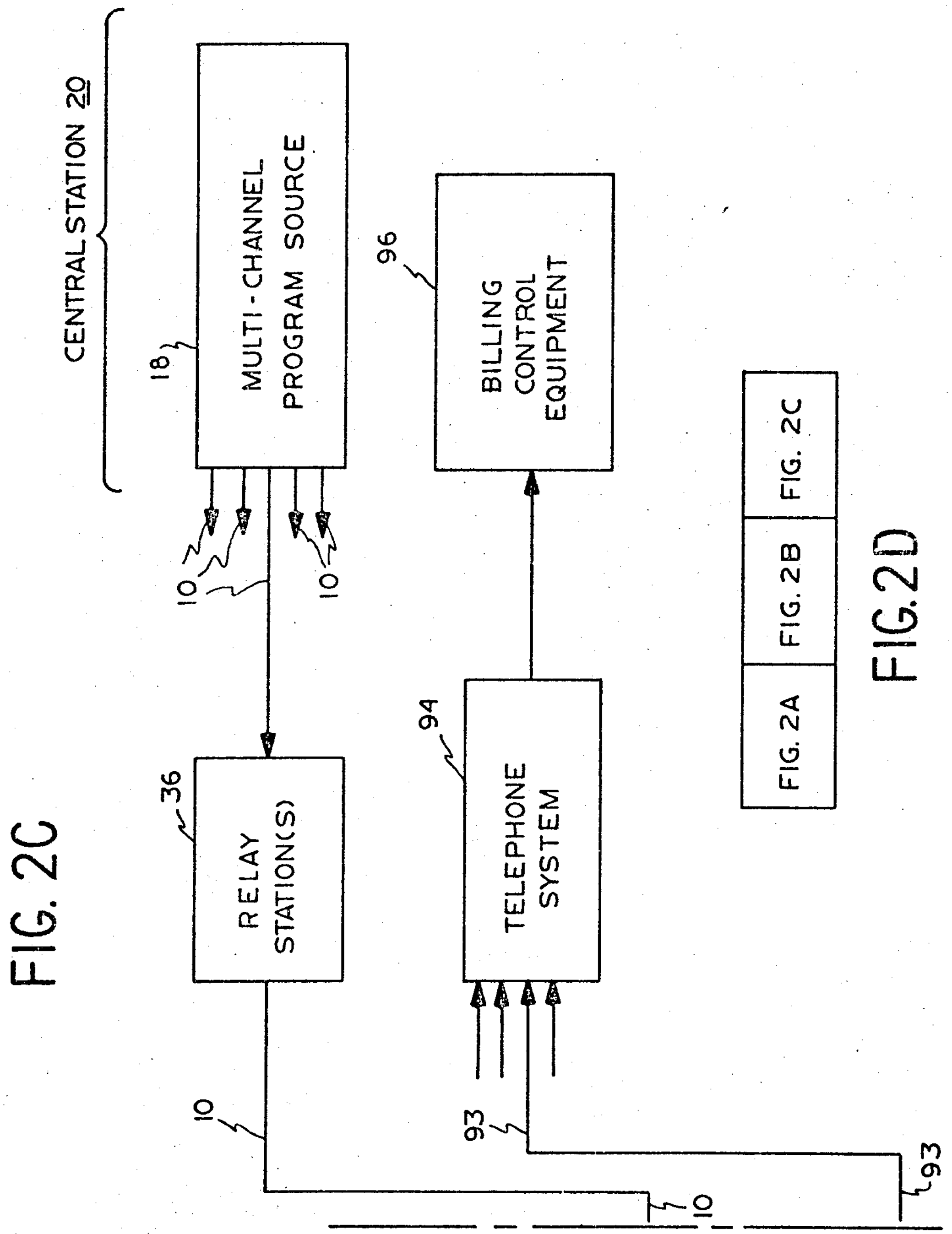
Figure 3:
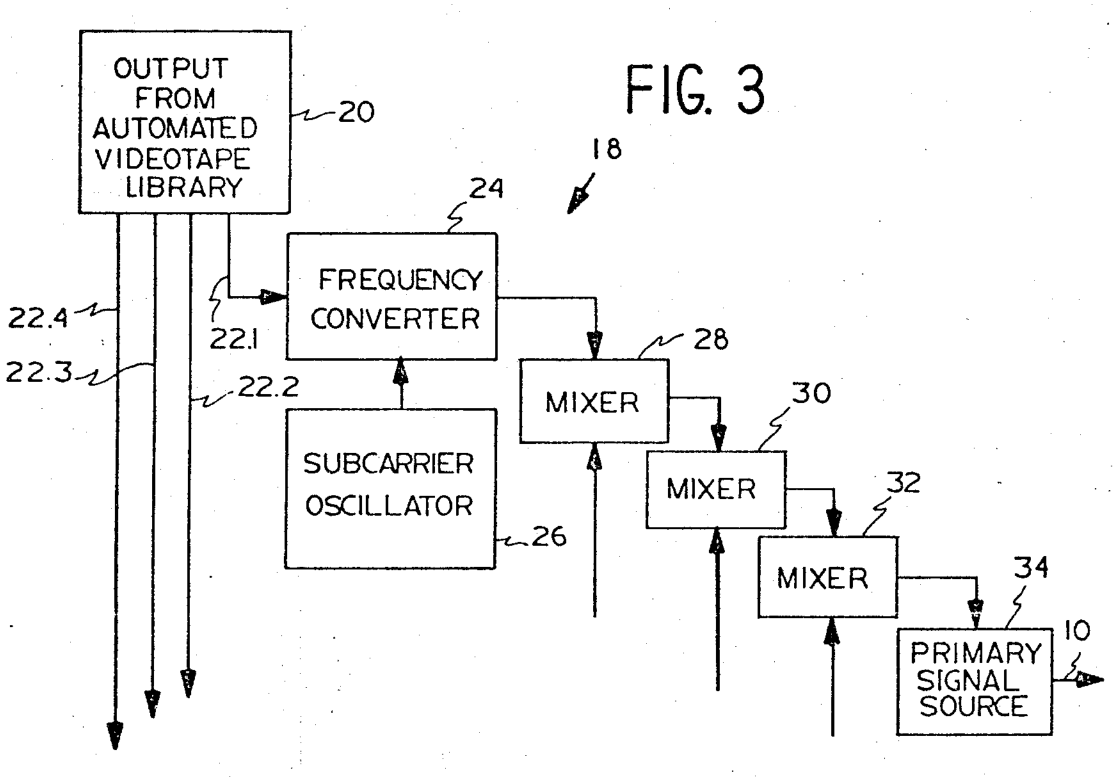
FIG. 3 is a block diagram of the program source of the system illustrated in FIG. 2.

Referring to FIG. 2, the multi-channel program source 18 is located at a central station 20, and provides a plurality of video signal outputs 10, each of which goes directly or through one or more relay stations 36 to the distribution stations 12. In a typical urban system there would be a large number of distribution stations 12, one or more for each neighborhood area. The communications links from the central station 20 to the relay stations 36 and distribution stations 12 may be a voice grade line, coaxial cable, microwave or optical link, or any other type of facility appropriate under the particular circumstances. In addition to the TV system specifically illustrated, this invention is applicable to other subscription services such as stock price quotations, music, off-track-betting results, weather reporting, surface or airline traffic information, etc.; and each service would have its own bandwidth requirements.

When the video signal 10 arrives at each distribution station 12 it is applied to a tuner 38. The function of the tuner is to select one of the 20 video channels available from the multi-channel program source 18. The channel signal selected by the tuner 38 controls a device 40 adapted to modulate an optical signal generated by a source 42. In accordance with the criteria recited in the Konnerth and Shah article mentioned above, the optical signal source 42 could be a coherent source such as a gas, solid state or gallium arsenide injection laser, or more likely a less expensive non-coherent gallium arsenide injection diode. The modulator 40 could be either of the optical or electronic type, depending on the signal source 42. If the signal source is a coherent or incoherent injection device, then the most practical approach would be direct electronic modulation. With other types of signal sources a Kerr cell or other form of optical modulation would be appropriate. The signal emanating from the optical signal source 42 is focused into a relatively narrow beam by conventional lenses 44, and aimed across an open air path between the distribution station 12 and subscriber station 16.

The distribution stations 12 are so positioned that each subscriber station 16 is within an optical line-of-sight radius of about 3 kilometers or less from a local distribution station. Experience has indicated that with present technology, if signal beam lengths are limited to a maximum of 3 Km a system availability of 98 percent is practically attainable. The most economical environment for a subscription system of this type is a built-up urban area. Each distribution station would likely be one of the taller buildings in the neighborhood, and it would distribute the final video signal link to all subscriber windows within the line of sight and within the selected maximum distance. In addition to neighborhood location, such other factors as the direction a particular window faces, and the presence of intervening buildings or other obstacles, will determine which of several nearly distribution stations would serve a particular subscriber. In some cases the signal beam may be routed in a circuitous path by the use of mirrors; this situation is intended to be comprehended by the term "line-of-sight path" as it is used herein.

At the subscriber station 16 the beam is refocused by conventional lenses 46 upon an optical sensor 48. If the optical signal source 42 is a gallium arsenide light emitting diode, which emits a signal in the infra-red region, a conventional silicon photocell has its maximum sensitivity at about the same frequency, and would be logical choice to serve as the optical sensor 48. The output of the sensor is detected by a demodulator 50 and fed to an amplifier 52 which in turn drives a frequency converter circuit 54 for down-converting the video signal to baseband. Circuit 54 includes tuning means responsive to a channel selector switch 56 which is manually movable to select among the 20 video channels provided by the multi-channel program source 18.

In each city there are usually one or more VHF commercial video channels which are unused under present allocations, for example channel 3 in New York City. Thus, for each locality in which the subscription system of this invention operates, one such unallocated commercial TV channel would be selected for use in receiving all twenty subscription channels made available by the program source 18. Using New York City as an example, the frequency converter 54 is provided with a module 58 which converts all signals from amplifier 52 (i.e. all subscription channels 1 through 20) to the assigned frequency for commercial channel 3. The New York City subscriber who wishes to watch any program emanating from the subscription system of this invention, tunes a channel selector 60 of a conventional TV set 62 to commercial channel 3. In other cities the module 58 would be designed to convert to some other channel which is unallocated in the area, and the subscriber would adjust his channel selector 60 accordingly. When the subscriber wishes to watch commercial television instead, he turns his channel selector 60 to any of the other channels allocated to commercial TV in that area. The commercial TV signal is received over a conventional TV antenna 64 connected to the TV set 62 in the conventional manner.

When the subscriber station circuitry is turned on, the frequency converter 54 sends a signal to a coding logic circuit 66, informing circuit 66 of the specific choice of subscription channels 1 through 20 for which switch 56 is set. The coding logic circuit 66 then generates a signal which indicates the choice of subscription channels in digitally coded form, and sends that coded signal to a modulator 68 which is similar to modulator 40 at the distribution station 12. The modulator 68 modulates the coded signal upon an optical signal source 70, which is similar to the signal source 42 at the distribution station 12. Signal source 70 then provides a code-modulated optical signal which is focused by conventional lenses 72, and sent back over the same open air path to the distribution station 12, where it is refocused by conventional lenses 74 upon another optical sensor 76, which is similar to sensor 48 at the subscriber station 16. The output of the sensor 76 is demodulated by a circuit 78 and applied to decoding logic 80 designed to decode the digital channel indication signal of circuit 66. One output 82 of the circuit 80 controls tuner 38 by tuning it to the subscription channel 1 through 20 indicated by switch 56 and coding logic circuit 66.

Another output 84 from the decoding logic 80 turns the distribution station optical signal source 42 on or off in response to the instructions emanating from coding logic 66. This signal 84 operates in conjunction with a pair of clock circuits, 86 at the subscriber station 16 and 88 at the distribution station 12, to make the subscription service more flexible and permit billing on a basis which is more fair to the customer.

In prior art subscription TV systems where the signal is normally present, and all that the subscription broadcaster actually sells is the information necessary to unscramble the signal, that information is usually sold for complete program entities of 30 minutes, an hour or longer duration. If the subscriber subsequently decides to turn off the program, there is no way the broadcaster can take back the unscrambling code, and no way that he can turn off the signal to any one subscriber without also cutting off service to all other subscribers on a common feeder line. Theoretically the unscrambling combination could be changed at shorter time intervals, but the subscriber does not want to be bothered obtaining the unscrambling key at frequency intervals during a program. Therefore, the broadcaster must quantize the subscriber charges in terms of complete programming units. If the subscriber does not wish to watch the entire program, he cannot obtain a refund for the unused portion.

In the present system the subscription broadcaster is actually selling the presence or absence of the optical signal provided by source 42. If a subscriber begins to watch a particular program and finds that he does not wish to continue, he can simply instruct the distribution station 12 to turn off the signal source 42. This provides an economically sound basis for the broadcaster to discontinue charging for the remainder of the program.

In a preferred embodiment of the invention, the subscriber informs the broadcaster of his decision by merely turning off the subscriber station equipment. Thus, circuit 80 at the distribution station 12 could continuously monitor a continuous signal originating from circuit 66 at the subscriber station 16, to determine the actual time during which subscriber continues to request subscription service. Alternatively, as shown in FIG. 2 the service requests could emanate from subscriber station circuit 66 at discrete intervals; but these intervals would be relatively short, of the order of one minute for example, rather than intervals equivalent to complete programs or other large blocks of time. Clock 86 at the subscriber station strobes coding logic circuit 66 at one minute intervals, causing circuits 68 and 70 to send a message indicating a request to start or continue sending service on a particular subscription channel 1 through 20. Clock 88 at the distribution station similarly strobes the decoding logic circuit 80 at one minute intervals (see arrow 91). Upon being strobed, if at any time during the previous one minute interval a request for service has not been received from circuit 66 at the subscriber station, i.e. if the subscriber has turned off his equipment during the last minute, decoding logic 80 sends a signal 84 which discontinues operation of the optical signal source 42. If, however, a signal from circuit 66 was received during the preceding 1 minute interval, i.e. if the subscriber's equipment is still on, the decoding logic 80 allows the signal source 42 to continue operation.

There are other methods of monitoring the subscriber's actual use of the subscription reception equipment. The other methods, however, must derive this information over a special communications channel going from each subscriber station to the broadcaster's equipment. The optical "feedback" approach described herein, however, requires no special communications medium, i.e. no telephone or dedicated wire links, from each subscriber station 16 to the subscription broadcaster. The present system uses, as the feedback transmission medium, the same open air that it uses to provide the programming service.

The decoding logic circuit 80 also provides a third output 90 to a buffer storage circuit 92 at the distribution station 12, which stores a running record of the duration of the subscription service provided and the particular subscription channels 1 through 20. It is contemplated that different programs, different subscription channels, or different blocks of time throughout the day may be sold at different prices, depending upon their relative desirability. Thus the signal provided by coding logic 66 indicates which particular subscription channel 1 through 20 is requested, and the broadcaster takes that information, the time of day, and the applicable price scale into account in calculating the cost. Then the buffer storage circuit 92, after storing the program duration and channel choice information, communicates it (see arrow 93) at an opportune time over the local telephone system 94 to billing control equipment 86 located at the central station 20.

Many subscriber stations 16 are served by each distribution station 12. Accordingly, the focusing optics 74, optical sensor 76, demodulator 78, decoding logic 80, tuner 38, modulator 40, optical signal source 42 and focusing optics 48 are repeated at the distribution station 12 for each subscriber station 16 served by that distribution station 12. The buffer storage 92 and clock 88 at each distribution station, however, serve all the subscriber stations 16 linked to that distribution station. The plurality of inputs 90 to the buffer storage 92 and outputs 91 from clock 88 thus indicate that these devices operate in conjunction with a plurality of decoding logic circuits 80. Similarly, the central station 20 serves a plurality of distribution stations 16. Thus, there is a plurality of inputs 93 from all the distribution stations 12 via the telephone system 94 to the billing control equipment 96, just as there are a plurality of outputs 10 from the multi-channel program source 18.

Figure 4:
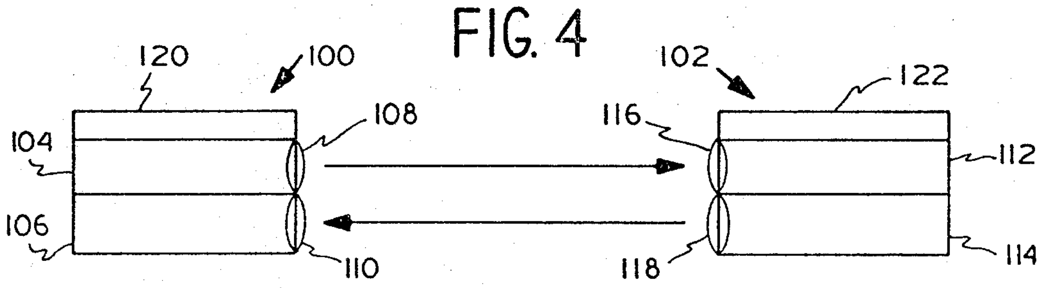
FIG. 4 is a schematic illustration of a cooperating pair of optical signal transceivers for use with the system of FIG. 2.
Figure 5:
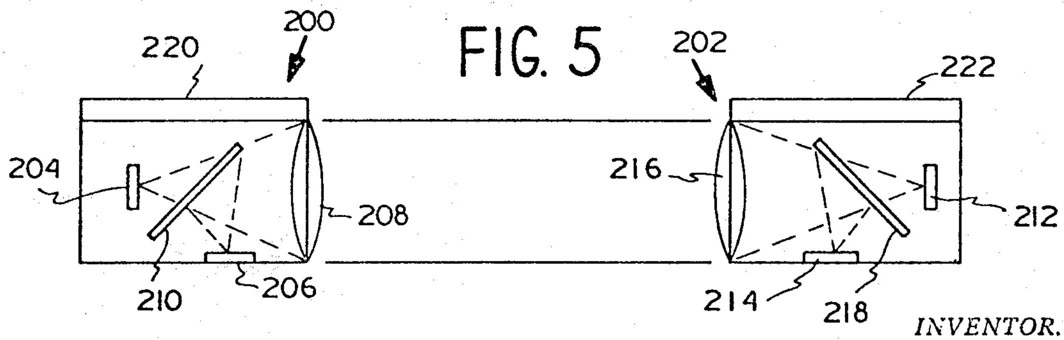
FIG. 5 is a schematic illustration of an alternative pair of optical signal transceivers, also designed for use with the system of FIG. 2.

One of the problems with optical communications links is accurate aiming of the signals. FIGS. 4 and 5 illustrate two alternative solutions to this problem. FIG. 4 shows a pair of transceiver units 100 and 102, one located at the subscriber station 16 and the other at the distribution station 12. Each transceiver has an upper and a lower section. The transceiver instrument 100 has an optical signal transmitter 104 above and an optical signal receiver 106 below. These sections 104 and 106 have focusing optics 108 and 110 respectively. In a similar manner, the cooperating transceiver instrument 102 at the other location has an optical signal receiver 112 above and an optical signal transmitter 114 below, and corresponding focusing optics 116 and 118 respectively. The two transceiver units are aimed at each other so that transmitter 104 beams an optical signal across an open air path to optical receiver 112, while transmitter 114 beams its optical signal across the same open air medium, along a closely adjacent path, to the optical receiver 106. For initial alignment purposes, sighting telescopes 120 and 122 are provided on the transceiver units 100 and 102 respectively. With the help of telescopes 120 and 122, both communications links, i.e. between transmitter 104 and receiver 112 and between transmitter 114 and receiver 106, are set up in the same operation.

The embodiment of FIG. 5 takes a somewhat different approach. There again a cooperating pair of transceiver instruments 200 and 202 are placed at the subscriber and distribution stations. Transceiver 200 has an optical signal source 204 operating at a first frequency, and an optical signal sensor 206 sensitive at a second frequency. The transmitter 204 and sensor 206 share a common focusing lens system 208. The transceiver unit 202 has an optical transmitter 213 operating at the second frequency, and an optical sensor 212 sensitive at the first frequency. The transmitter 214 and sensor 212 share a common focusing lens system 216. Dichroic mirros 210 and 218 in the transceiver units 200 and 202 respectively serve as beam splitters for separating the first and second frequencies. Thus, the beam emitted by source 204 at the first frequency passes through dichroic mirrors 210 and 218 to the sensor 212. In contrast, the signal which is radiated by source 214 is reflected by dichroic mirrors 218 and 210 and impinges upon sensor 206. The two beams share the same open air path. Once again, sighting telescopes 220 and 222 respectively are provided for initial alignment.

Outdoor weather conditions are, of course, a factor which affects any optical communications system operating in the open air. This factor, however, is seen as just one of the engineering trade-offs which any communications system must accept. An optical system is practical if the probability is that the system would be available, i.e. in good working order, a sufficiently high percentage of the time (e.g. 98 percent in the Konnerth-Shah installation at Montreal). A small amount of down-time is acceptable in many other fields, and does not make the service in question economically unfeasible. For example, our automobiles, airplanes, trains, electricity telephones, and almost all other services are subject to occasional lapses, often for reasons of inclement weather, and the public has simply accepted this risk.

The present system, however, is designed to prevent the subscriber from being charged unfairly as a result of a situation in which the feedback signal from the subscriber station results in a charge to the subscriber's account, while the service signal is so degraded by weather conditions that the subscriber can not enjoy the signal for which he is being charged. The signal-to-noise ratio of both the service signal and the feedback signal are made substantially equal, and thus about equally subject to degradation by adverse weather conditions. As a result, the level of atmospheric opacity at which the service signal becomes no longer useful to the subscriber is the same point at which the feedback signal also becomes ineffective to cause the automatic equipment at the distribution station to charge the subscriber for services rendered. This is an additional economic safeguard for the subscriber, which prevents the billing equipment from charging him for programming time falling within the down-time due to adverse weather conditions.

Assuming that the optical video signal provided by source 42 is more heavily modulated than the coded optical signal provided by source 70, if both signals were radiated at equal power the less heavily modulated one would have a lower signal-to-noise ratio under equivalent atmospheric conditions. (Such equivalency would obviously obtain in the common air medium shared by the two signals, whether the embodiment of FIG. 4 or FIG. 5 is employed.) To compensate for this, the less heavily modulated signal is radiated at somewhat lower power, to bring the signal-to-noise ratios of the two signals into substantial parity. Then, since they share the ambient weather conditions, the vulnerability of the two signals to degradation by weather will be substantially equal. It follows that whenever the programming service signal provided by source 42 is so degraded that it can no longer provide a satisfactory TV picture, the request signal provided by the source 70, upon which billing is normally based, will also be degraded to the point of ineffectiveness.

Since the foregoing description and drawings are merely illustrative, the scope of protection of the invention has been more broadly stated in the following claims; and these should be liberally interpreted so as to obtain the benefit of all equivalents to which the invention is fairly entitled.

The embodiments of the invention in which an exclusive property or privilege is claimed are defined as follows:

1. A bidirectional subscription communication system for serving a number of subscriber stations; comprising:

at least one distribution station, a plurality of said subscriber stations all being within signalling range of said distribution station, respective independently operable optical communications links for individually transmitting a communications service signal from said distribution station to each of said subscriber stations, each of said independent communications service signals having an associated information content, and means for optically transmitting service request message signals from each of said subscriber stations to said distribution station, said distribution station having respective means for receiving said request message signals, means effective in response to receipt of said request message signals to enable the respective service signal sources, at least two of said service signals being transmitted respectively to two different subscribers being at the same frequency and wavelength and having a different associated information content, said service signals being transmitted with space diversity, and means also responsive to said request message signals to record the economic accountability of the subscribers for communications service, respective equipment at said subscriber stations each having an "on" condition and an "off" condition, said request transmitting means being responsive to said "on" condition of the equipment at the respective subscriber stations to send a service request message signal, and said enabling means at said distribution station being effective to disable respective service signal sources at least when respective predetermined request message signals are not received from the respective subscriber stations.

2. A system as in claim 1 further comprising clock means at respective subscriber stations and at said distribution station arranged to deliver sampling signals at regular intervals, said request signal transmitter at each subscriber station being responsive to its respective clock means to send said predetermined request messages at each clock sampling interval, and said respective enabling means being responsive to said clock means to disable said service signal sources only at clock sampling intervals and only if their respective predetermined feedback messages have not been received during the preceding interval.

3. A system as in claim 2 comprising an optical request signal source and optical service signal receiver at each subscriber station mounted in a first common instrument, and an optical request signal receiver and optical service signal source for each subscriber station mounted in a second common instrument at said distribution station, and each said common instrument is arranged to transmit and receive said optical signals over a common path or closely adjacent paths whereby the request and service signals can be jointly aimed.

4. A system as in claim 3 wherein each said common instrument comprises contiguous signal transmitting and signal receiving sections, each of which includes respective optical focusing means having parallel optical axes.

5. A system as in claim 3 wherein each said common instrument comprises common optical focusing means for handling signals transmitted and received over a common path, a dichroic mirror beam splitter aligned with said focusing means, the signal source and signal receiving means of each said common instrument being located at respective focal points defined by said focusing means for the split beams of said dichroic mirror, and wherein said service and feedback signals are of different optical frequencies split by said dichroic mirror to reach said respective focal points.

6. A system as in claim 3 wherein said common instrument includes an alignment telescope having an optical axis parallel to said common path or closely adjacent signal paths.

7. A system as in claim 2 wherein the service signal and request signal for each subscriber station are optical signals arranged to travel one or more open air paths sharing the same weather conditions, and the vulnerability of said request signal to degradation of its signal-to-noise ratio under adverse weather conditions is at least as great as that of said sercie signal.

8. A system as in claim 7 wherein said service and request signals are optical.

9. A bidirectional subscription communication system for serving a number of subscriber stations; comprising:

at least one distribution station, a plurality of said subscriber stations all being within signalling range of said distribution station, respective independently operable optical communications links for transmitting a communications service signal from said distribution station to each of said subscriber stations, and means for transmitting service request message signals from each of said subscriber stations to said distribution station, said service request message signals and said communications service signals having substantially identical initial signal to noise ratios at their respective points of transmission, said distribution station having respective means for receiving said request message signals, means effective in response to receipt of said request message signals for enabling the respective service signal sources and for recording the economic accountability of the subscribers for communications service, respective equipment at said subscriber stations each having an "on" condition and an "off" condition, said request transmitting means being responsive to said "on" condition of the equipment at the respective subscriber stations to send a service request message signal having said initial signal to noise ratio, and said enabling means at said distribution station being effective to disable respective service signal sources and accountability recording means when the signal to noise ratio of the received respective predetermined request message signal from the respective subscriber stations does not exceed a predetermined value with respect to said initial signal to noise ratio.

* * * * *